United States Patent

Petzold et al.

[15] 3,642,504
[45] Feb. 15, 1972

[54] GLASS CONVERTIBLE TO TRANSPARENT GLASS CERAMICS CONTAINING ALPO

[72] Inventors: Jurgen Petzold; Herwig Scheidler, both of Mainz-Mombach, Germany

[73] Assignee: JENAer Glaswerk Schott & Gen., Mainz/Hattenbergstrasse, Germany

[22] Filed: July 1, 1968

[21] Appl. No.: 743,580

[30] Foreign Application Priority Data

July 1, 1967 Germany ...................... P15 96 860.2
Nov. 22, 1967 Germany ...................... P15 96 865.7
Jan. 3, 1968 Germany ...................... P16 96 062.6

[52] U.S. Cl. .................. 106/39 DV, 106/52, 65/33
[51] Int. Cl. ........................................ C04b 33/00
[58] Field of Search ................ 106/39 DV, 52; 65/33

[56] References Cited

UNITED STATES PATENTS

| | | | |
|---|---|---|---|
| 3,549,394 | 12/1970 | Perrotta | 106/39 DV |
| 3,157,522 | 11/1964 | Stookey | 106/39 |
| 3,241,985 | 3/1966 | Kuwayama | 106/39 |
| 3,252,811 | 5/1966 | Beall | 106/39 |
| 3,282,712 | 11/1966 | Tashiro et al. | 106/39 |
| 3,380,818 | 4/1968 | Smith | 106/39 |

FOREIGN PATENTS OR APPLICATIONS 6,605,388 10/1967 Netherlands ........................... 106/39

OTHER PUBLICATIONS

Perrotta et al. — "Beta Eucryptite Crystalline Solutions Involving P 5+"
J. Am. Cer. Soc. Vol. 50, No. 2, p. 112, Feb. 21, 1967

*Primary Examiner*—James E. Poer
*Assistant Examiner*—W. R. Satterfield
*Attorney*—Burgess, Dinklage & Sprung

[57] ABSTRACT

Glass ceramics made from an initial glass composition, in weight percent, of $SiO_2$ : 35-70
$Al_2O_3$ : 12-32
$P_2O_5$ : 5-17
$Li_2O$ : 2-5
$MgO$ : 0-4
$ZnO$ : 0-5
$TiO_2$ : 1.5-6
$ZrO_2$ : 0.5-3
$Na_2O$ : traces-0.6
$As_2O_3$ : 0.5-1.0, where the $P_2O_5$ to $TiO_2$ ratio is up to about 4, and where the sum of $ZrO_2$ and $TiO_2$ is at least about 3 weight percent.

13 Claims, No Drawings

GLASS CONVERTIBLE TO TRANSPARENT GLASS CERAMICS CONTAINING ALPO₄

The present invention relates to transparent glass ceramics having low coefficients of thermal expansion. It more particularly refers to transparent glass ceramic articles having coefficients of expansion of about zero, as well as to methods of producing such articles.

The basis for the method of converting glasses by controlled crystallization into vitreous-crystalline condition and thus obtain glass ceramics, the properties of which are determined essentially by the crystal phase distributed at random in the glass matrix, have already frequently been described in detail in the literature (German Pat. No. 1,045,056; P. W. McMillan, "Glass Ceramics," Academic Press, London and New York, 1964).

Transparent glass ceramics of low thermal expansion are known, whose low $\alpha$ values are caused by solid solutions contained therein having an $\beta$-quartz structure (frequently also referred to as solid solutions with $\beta$-eucryptite structure or $\beta$-eucryptite like crystals). Such glass ceramics are obtained by controlled crystallization of glasses of the system $Li_2O$-$Al_2O_3$-$SiO_2$ with $TiO_2$ and/or $ZrO_2$ as nucleating agents. It is furthermore known that transparent glass ceramics with $\beta$-quartz can be obtained from base glasses, which, in addition to $Li_2O$, $Al_2O_3$, $SiO_2$, $TiO_2$ and $ZrO_2$, also contain specific amounts of MgO and ZnO. The components MgO and ZnO, in case of a suitable ratio of $Li_2O+MgO+ZnO/Al_2O_3$, enter into the solid solutions with quartz structure. The concentration range of glasses, from which $\beta$-quartz solid solutions can separate out so that transparent glass ceramic materials of low thermal expansion are produced, has been considerably broadened by the components MgO and ZnO. Nevertheless, such glass-ceramic starting glasses, having the main components $SiO_2$, $Al_2O_3$, $Li_2O$, MgO, ZnO, $TiO_2$ and $ZrO_2$, have high working temperatures ($\eta=10^4$ poise), so that difficulties are encountered in attempting to use continuous working processes (automatic pressing or blowing) for such glasses.

The object of the present invention is to develop glasses having viscosity properties which make it possible both to press them automatically and to blow them automatically in continuous operation, and which can thereupon be converted by controlled crystallization, during an economical, uncomplicated heat treatment, into a vitreous-crystalline condition in such a manner that there are produced objects which are of transparent appearance, have low coefficients of expansion, preferably close to a value of zero, and are not deformed.

Other and additional objects of this invention will become apparent from a consideration of this entire specification, including the claims hereof.

In accord with, and fulfilling these objects, one aspect of this invention resides in glasses of the following compositions in weight percent.

| | |
|---|---|
| $SiO_2$ | 35–70 |
| $Al_2O_3$ | 17–32 |
| $P_2O_5$ | 5–17 |
| $Li_2O$ | 2–5 |
| MgO | 0–4 |
| ZnO | 0–5 |
| $TiO_2$ | 1.5–6 |
| $ZrO_2$ | 0.5–3 |
| $Na_2O$ | traces–0.6 |
| $As_2O_3$ | 0.5–1.0 | wherein the ratio of $P_2O_5$ to $TiO_2$ is up to about 4, and wherein the sum of $ZrO_2$ and $TiO_2$ is at least 3 weight percent.

In a preferred aspect of this invention, glass compositions are provided containing at least about 90 weight percent of solid solutions of quartz structure having the general formula
$Li_{2-2(v+w)}Mg_vZn_w \cdot O \cdot Al_2O_3 \cdot xAlPO_4 \cdot (y-2x)SiO_2$, wherein:

$v = 0$–$0.4$
$w = 0$–$0.5$
$y = 5$–$8$
$x = 0.5$–$1.5$ wherein:

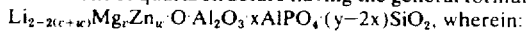

The components $Na_2O$ (as nitrate) and $As_2O_3$ serve as fining agents. Glass-ceramic starting glasses of the composition range in accordance with the invention have working temperatures ($T$ at $\eta=10^4$ poise) of between 1,190°–1,320° C. and are thus easy to adapt to the traditional processes of working, such as blowing, pressing, rolling, and casting. In order to convert the articles produced from the starting glasses in accordance with the invention into transparent, vitreous-crystalline condition, in which condition they do not deform to any appreciable extent, they are heated at most about 3° C./min. to temperatures of 50°–70° C. above and transformation points of the glasses, held there for at least about 30 minutes to develop the crystallization nuclei, heated at a rate of not more than about 3° C./min. to temperature of 140°–190° C. above the transformation points of the glasses, maintained at such temperature until sufficient crystallization is obtained, and then cooled as rapidly as desired to room temperature. The resultant glass-ceramic bodies are transparent, of yellowish-brown color, have $\alpha_{20\text{-}300}$ values of between $-6$ and $\times 35 \times 10^{-7}$/° C. and have better mechanical and chemical properties than the initial glasses which have been thus heat treated.

The low viscosity of the glasses of the invention, as compared with known starting glasses for transparent glass ceramics of low thermal expansion, was essentially obtained by reduction of the $SiO_2$ content and with an increase in the $Al_2O_3$ and $P_2O_5$ contents in the molar ratio of about 1:1. The fact that it is nevertheless possible to convert such glasses, which may contain as little as 35 percent by weight $SiO_2$, in addition to as much as 17 percent by weight $P_2O_5$, by crystallization of $\beta$-quartz solid solutions into a transparent, vitreous-crystalline condition, with the content of crystalline phase being not lower than in the case of compositions richer in $SiO_2$, is to be ascribed to the phenomenon, clearly established by X-ray and infrared spectroscopic examinations, that in $\beta$-quartz solid solutions $SiO_2$ can be extensively replaced isomorphically by $AlPO_4$ without the characteristic low expansion of the $\beta$-quartz solid solutions being lost.

Starting from a solid solution with $\beta$-quartz structure of the system $Li_2O \cdot Al_2O_3 \cdot 2SiO_2$–$SiO_2$ with the general form $Li_2O \cdot Al_2O_3 \cdot ySiO_2 (y \geq 2)$, there is obtained, when the substitutions $Zn^{2+} + 2Al^{3+} \rightleftarrows 2Si^{4+}$; $Mg^{2+} + 2Al^{3+} \rightleftarrows 2Si^{4+}$ and $P^{5+} + Al^{3+} \rightleftarrows 2Si^{4+}$ are carried out, a solid solution with quartz structure of the general formula $Li_{2-2(v+w)}Mg_vZn_w \cdot O \cdot Al_2O_3 \cdot xAlPO_4(y-2x)SiO_2$. This solid solution was used for the calculation of the initial glasses in accordance with the invention, in which connection in each case at least 90 percent by weight of each glass composition corresponds to the composition of a quartz-solid solution of the formula indicated. The remainder is contributed by the components responsible for nucleation ($TiO_2 + ZrO_2$) and for fining ($Na_2O$ as nitrate and $As_2O_3$) or to a limited excess of $Al_2O_3$ (referred to the solid solution composition). The initial glasses of this composition can be particularly readily converted into the transparent, vitreous-crystalline state by controlled crystallization since it can be assumed that the crystal and residual glass phases contained in the glass ceramics are similar with respect to their chemical composition so that no great differential in the index of refraction is to be expected at the phase boundaries.

By way of explanation, but not limitation, of the present invention, the following 10 examples are set forth in Table 1; in Table 2 properties of the initial glasses are compared with the properties of the corresponding glass ceramics obtained therefrom.

TABLE 1

| No. | 1 | 2 | 3 | 4 | 5 | 6 | 7 | 8 | 9 | 10 |
|---|---|---|---|---|---|---|---|---|---|---|
| $SiO_2$ | 63.0 | 60.7 | 57.4 | 55.3 | 53.2 | 51.3 | 46.7 | 46.0 | 44.5 | 38.9 |
| $Al_2O_3$ | 21.0 | 19.7 | 23.3 | 25.0 | 26.3 | 24.3 | 28.8 | 28.8 | 26.5 | 29.5 |
| $P_2O_5$ | 5.3 | 6.3 | 6.0 | 7.9 | 7.8 | 10.5 | 11.6 | 11.6 | 15.7 | 15.3 |
| $Li_2O$ | 2.7 | 3.1 | 2.9 | 4.5 | 3.9 | 3.4 | 3.8 | 3.8 | 3.1 | 2.2 |
| MgO | 1.2 | 0.9 | 2.7 | 0.5 | 1.2 | 1.0 | 1.1 | 1.0 | 0.9 | 2.2 |
| ZnO | 2.4 | 1.8 | 1.7 | 1.5 | 2.2 | 2.0 | 2.2 | 2.2 | 1.8 | 4.4 |
| $TiO_2$ | 1.5 | 4.6 | 3.2 | 2.2 | 2.6 | 4.6 | 3.0 | 3.7 | 4.6 | 4.6 |
| $ZrO_2$ | 2.3 | 1.9 | 1.7 | 1.9 | 1.7 | 1.8 | 1.8 | 1.8 | 1.9 | 1.9 |
| $Na_2O$ | Traces | 0.5 | 0.5 | 0.5 | 0.3 | 0.6 | 0.5 | 0.5 | 0.5 | 0.5 |
| $As_2O_3$ | 0.6 | 0.5 | 0.6 | 0.7 | 0.5 | 0.5 | 0.5 | 0.5 | 0.5 | 0.5 |

TABLE 2

| Number | 1 | 2 | 3 | 4 | 5 | 6 | 7 | 8 | 9 | 10 |
|---|---|---|---|---|---|---|---|---|---|---|
| Glass properties: | | | | | | | | | | |
| $V_A(\eta=10^4 \text{ p.})(^\circ C.)$ | | 1,300 | 1,260 | | 1,240 | | 1,206 | 1,195 | 1,226 | 1,205 |
| Transformation: | | | | | | | | | | |
| Temperature (°C.) | 688 | 630 | 660 | 654 | 650 | 639 | 642 | 640 | 637 | 645 |
| At 20-300·10⁷ (°C.) | 31.6 | 38.7 | 37.7 | 45.0 | 42.0 | 40.1 | 43.0 | 44.0 | 35.9 | 36.6 |
| Density (gr./cm.³) | | 2.45 | 2.46 | 2.45 | 2.47 | 2.46 | 2.47 | 2.49 | 2.45 | 2.55 |
| Properties of the transparent glass ceramics at 20-300·10⁷ (°C.⁻¹) | 4.6 | 3.0 | 12.0 | −6.0 | 0.5 | 0.5 | 1.0 | 3.0 | 18.0 | 35.0 |
| Density (gr./cm.³) | | 2.55 | 2.56 | 2.54 | 2.53 | 2.55 | 2.55 | 2.54 | 2.55 | 2.57 | 2.67 |
| Crystal phases | Quartz solid solutions, plus $ZrO_2$-containing nucleus phase | | | | | | | | | |

It is evident from the examples given that the coefficient of expansion on the resultant transparent glass ceramics depends little on their $P_2O_5$ content. It can easily be controlled by the $Li_2O$ content. In order to obtain particular low coefficients of expansion with samples having a high amount of $P_2O_5$, one requires, to be sure, more $Li_2O$ than in the case of samples which are poor in $P_2O_5$. Increasing contents of $P_2O_5$ in the base glasses require higher $TiO_2$ contents if transparent glass ceramics are to be produced. The ratio of $P_2O_5$ to $TiO_2$ must therefore be ≤ 4, in which connection the $ZrO_2$ addition should not be less than 0.5 percent by weight. The total amount of nucleation agents should not be less than 3 percent by weight, and the minimum $TiO_2$ concentration should not be less than 1.5 percent by weight if the controlled crystallization of the initial glasses is to lead to transparent vitreous-crystalline bodies.

It has furthermore been found that initial glasses in accordance with the invention, having the following composition range, are preferred for automatic pressing in continuous tank operation due to their viscosity properties and the position of their liquidus temperatures:

Composition in percent by weight:

| | |
|---|---|
| 52–56 | $SiO_2$ |
| 24.5–28 | $Al_2O_3$ |
| 7.5–9 | $P_2O_5$ |
| 3.7–4 | $Li_2O$ |
| 0.9–1.1 | $MgO$ |
| 2–2.5 | $ZnO$ |
| 2.6–2.9 | $TiO_2$ |
| 1.7–1.9 | $ZrO_2$ |
| 0.5–0.7 | $As_2O_3$ |
| 0.5–0.6 | $Na_2O$ |

The compositions of these base glasses should correspond to at least 90 percent by weight of the composition of a solid solution with quartz structure of the general formula $Li_{2-2(c+x)} Mg_c Zn_w \cdot O \cdot Al_2O_3 \cdot xAlPO_4(y-2x)SiO_2$ and, aside from an excess of $Al_2O_3$ which is limited with respect to this formula, in addition only contain components for nucleation ($TiO_2 + ZrO_2$) and for fining ($Na_2O$ as $NaNO_3$ and $As_2O_3$). The conversion of such base glasses into the transparent vitreous-crystalline condition, whereby shaped articles are obtained having coefficients of expansion, which are at or close to a value of zero, is accomplished by heating them, at a maximum of 3°C./min., to about 50°C. above their transformation temperature; holding them at this temperature for at least about 30 minutes; heating them further, at a rate of not more than about 3°C./min., to 790°–850°C.; holding them at that temperature until sufficient crystallization has been obtained; and then finally cooling them as rapidly as desired.

This invention is illustrated by the following examples which are in no way limiting thereon.

EXAMPLE 1

To produce 100 kg. of glass, there are mixed together in a commercial mixer for about 30 minutes 52.28 kg. of sand, 31.55 kg. hydrated alumina, 9.60 kg. of lithium carbonate, 2.24 kg. of zinc oxide, 2.66 kg. of magnesium carbonate, 14.49 kg. of aluminum orthophosphate, 0.50 kg. of arsenic, 1.65 kg. of sodium nitrate, 2.81 kg. of titanium dioxide and 2.77 kg. of zirconium silicate. The mixture is melted down in a ceramic pot, at a melting temperature of 1,600°C., for 12 hours and refined for 18–24 hours at 1,600°C. Glass articles were produced from this melt, by pressing or blowing or pulling or rolling or casting, and finally cooled. The cooling was accomplished from 660°C. with cooling rates of 0.1°–20°C./min., depending on the size and wall thickness of the article to be cooled. The properties of this glass, which has the oxide composition set forth below in weight percent, are set forth in Table 3:

53.00 $SiO_2$; 26.30 $Al_2O_3$; 7.80 $P_2O_5$; 1.10 $MgO$; 3.85 $Li_2O$; 2.20 $ZnO$; 2.80 $TiO_2$; 1.85 $ZrO_2$; 0.5 $As_2O_3$ and 0.6 $Na_2O$.

TABLE 3

Properties of the initial glass:

| | | | |
|---|---|---|---|
| Temperature at $\eta=1\cdot10^3$ poise | | (°C.) | 1410 |
| Temperature at $\eta=4\cdot10^3$ poise | | (°C.) | 1305 |
| Temperature at $\eta=10^4$ poise (VA) | | (°C.) | 1242 |
| Transformation temperature | | (°C.) | 650 |
| Coefficient of expansion ×10⁷(20–300) | | (°C.⁻¹) | 43 |
| Density | | (g./cm.³) | 2.46 |
| Vickers hardness (50 gr.) | | (kg./mm²) | 800 |
| Bending strength | | (kg./cm²) | 850 |
| Modulus of elasticity | | (kg./mm²) | 8539 |
| Poisson's number | | | 0.225 |
| Thermal conductivity | | (kcal./h., m., grd.) | 0.9 |
| Resistance to hydrolysis | DIN 12111 | (mg.$Na_2O$/g.) | 0.018 |
| Resistance to acids | DIN 12116 | (mg./dm.²) | 105 |
| Resistance to alkali | DIN 52322 | (mg./dm.²) | 141 |
| Transmittance | $\lambda=550$ m/µ, d=1 cm.) % | | 90 |

In order to convert such glass articles, without deformation, into the transparent, vitreous-crystalline state, they are heated at the rate of 2°C./min. to 700°C., maintained at that temperature for 30 minutes, heated at a rate of 2°/min. to 810°C., held there for 90 minutes, and finally cooled as rapidly as desired. A transparent, vitreous-crystalline body produced in this manner has the properties set forth in Table 4.

TABLE 4

Properties of transparent glass ceramics:

| | | |
|---|---|---|
| Coefficient of expansion ×10⁷(20–300) | (°C.⁻¹) | 1 |
| Density | (g./cm.³) | 2.53 |
| Vickers hardness (50 gr.) | (kg./mm²) | 1000 |
| Bending strength | (kg./cm²) | 950 |
| Modulus of elasticity | (kg./mm²) | 9247 |
| Poisson's number | | 0.249 |
| Thermal conductivity | (kcal./h., m., g.) | 1.41 |
| Resistance to | | |

| | | | |
|---|---|---|---|
| hydrolisis | DIN 12111 | (mg.Na₂O/g.) | 0.014 |
| Resistance to acid | DIN 12116 | (mg./dm.²) | 38 |
| Resistance to alkali | DIN 52322 | (mg./dm.²) | 112 |
| Transmittance = | λ= 550 m/μ; d=1 cm.) % | | 70 |
| Crystalline phases | | | h-quartz solid solutions, ZrO₂containing nucleus phase. |

Furthermore, it has been found that the starting glasses for producing transparent glass ceramics with coefficients of expansion of about zero in accord with this invention can be automatically pressed as well as automatically blown without difficulty on basis of their viscosity properties and the position of their liquidus temperatures in continuous tank operation if their compositions lie within the following preferred concentration range in percent by weight:

| | |
|---|---|
| 57–60 | SiO₂ |
| 21–24 | Al₂O₃ |
| 6–8 | P₂O₅ |
| 3.3–3.6 | Li₂O |
| 1.5–2 | ZnO |
| 0.5–0.9 | MgO |
| 2.0–3.0 | TiO₂ |
| 1.7–2.0 | ZrO₂ |
| 0.5–1.0 | As₂O₃ |
| 0.5–0.6 | Na₂O |

The compositions of the glass ceramics of the invention corresponding, to an extent of at least 90 percent by weight, to the compositions of solid solutions with quartz structure of the general formula $Li_{2-2(r+w)}Mg_rZn_w \cdot O \cdot Al_2O_3 xAlPO_4(y-2x)SiO_2$. The balance is derived from the nucleation components $(TiO_2+ZrO_2)$, the fining components $(NaNO_3+As_2O_3)$, or the $Al_2O_3$ excess limited with respect to the solid solution composition.

The objects produced from glasses of this composition range are heated in accordance with the invention at the rate of at most about 3° C./min. to temperatures of 50°–70° C. above their transformation points, held there for at least 30 minutes, heated further at a rate of at most about 3° C./min. to temperatures of 815°–850° C., held there until sufficient crystallization has taken place, and finally cooled as rapidly as desired.

EXAMPLE 2

An initial glass of the following oxide composition in weight percent is melted down:

| | | | | |
|---|---|---|---|---|
| 58.0 | SiO₂ | 1.7 | ZnO | |
| 22.8 | Al₂O₃ | 0.7 | MgO | |
| 7.3 | P₂O₅ | 2.9 | TiO₂ | |
| 3.5 | Li₂O | 1.7 | ZrO₂ | |
| | | 0.6 | Na₂O | |
| | | 0.8 | As₂O₃ | |

In order to produce 100 kg. of glass of this composition, 57.40 kg. of sand, 26.77 kg. of hydrated alumina, 8.73 kg. of lithium carbonate, 1.73 kg. of zinc oxide, 1.69 kg. of magnesium carbonate, 13.55 kg. of aluminum orthophosphate, 2.55 kg. of zirconium silicate, 2.91 kg. of TiO₂, 0.81 kg. of arsenic and 1.65 kg. of sodium nitrate are homogenized for about 30 minutes in an ordinary commercial mixer. The mixture is melted down in a ceramic pot at a melting temperature of about 1,600° C. for 12 hrs. and refined at this temperature for 22–24 hrs. Glass articles are produced from this melt by pressing or blowing or drawing or rolling or casting and finally cooled. The cooling is effected from 670° C. at cooling rates of 0.1°–20° C. per hour, depending on the size and wall thickness of the article being cooled. The properties of such a starting glass in accordance with the invention are set forth in Table 5.

TABLE 5

Properties of the initial glass:

| | | | |
|---|---|---|---|
| Temperature with $\eta=1 \cdot 10^3$ poise | | (°C.) | 1480 |
| Temperature with $\eta=2.3 \cdot 10^3$ poise | | (°C.) | 1405 |
| Temperature with $\eta=4 \cdot 10^3$ poise | | (°C.) | 1360 |
| Temperature with $\eta=1 \cdot 10^4$ poise (V_a) | | (°C.) | 1297 |
| Transformation temperature | | (°C.) | 660 |
| Liquidus temperature | | (°C.) | 1310±10 |
| Coefficient of expansion ×10⁷(20–300° C.) | | (°C.⁻¹) | 39.5 |
| Density | | (g./cm.³) | 2.42 |
| Knoop hardness (50 gr.) | | (kg./mm.²) | 870 |
| Bending strength | | (kg./cm.²) | 800 |
| Modulus of elasticity | | (kg./mm.²) | 8090 |
| Poisson's number | | | 0.211 |
| Thermal conductivity | | (kcal./h.,m.,grd.) | 1.04 |
| Index of refraction | | | 1.521 |
| Abbe number | | | 57.34 |
| Transmittance | (λ=550 m/μ; thickness=5 mm.) (%) | | 91 |
| Resistance to hydrolysis | DIN 12111 | (mg.Na₂O/g.) | 0.016 |
| Resistance to acid | DIN 12116 | (mg./dm.²) | 24 |
| Resistance to alkali | DIN 52322 | (mg./dm.²) | 90 |

In order to convert such glass bodies, without deformation, into the transparent, vitreous-crystalline condition, they were heated, at a rate of 3° C. per minute, first of all to 550° C., and then brought, at a rate of 1° C. per minute, to 725° C., held there for 90 minutes, heated further, at a rate of 1° C. per minute, to 830° C., held there for 180 minutes, and finally cooled as rapidly as desired. The transparent glass ceramic produced in this manner had the properties set forth in Table 6.

TABLE 6

Properties of the transparent glass ceramic:

| | | | |
|---|---|---|---|
| Coefficient of expansion ×10⁷(20–300° C.) | | (°C.⁻¹) | ±0 |
| Coefficient of expansion ×10⁷(20–800° C.) | | (20 C.⁻¹) | −0.5 |
| Density | | (g./cm.³) | 2.52 |
| Knoop hardness (50 gr.) | | (kg./mm.²) | 1060 |
| Bending strength | | (kg./cm.²) | 900 |
| Modulus of elasticity | | (kg./mm.²) | 9020 |
| Poisson's number | | | 0.238 |
| Thermal conductivity | | (kcal./h.m.grd.) | 1.40 |
| Index of refraction | | | 1.543 |
| Abbe number | | | 54.97 |
| Transmittance | (λ=550 m/μ; d=5 mm.) (%) | | 80 |
| Resistance to hydrolysis | DIN 12111 | (mg.Na₂O/g.) | 0.011 |
| Resistance to acid | DIN 12116 | (mg./dm.²) | 15 |
| Resistance to alkali | DIN 52322 | (mg./dm.²) | 70 |
| | | | h-quartz solid solutions +ZrO₂-containing nucleus phase |

If slower rates of heating are used to convert a compact glass casting of the composition of the invention into the vitreous-crystalline state due to the greater thickness of the objects, the holding time for the development of crystallization nuclei can be done away with.

EXAMPLE 3

A cube of glass having the composition of Example 2 and an edge length of 100 mm. was heated at a rate of 4° C. per hour, to 830° C. and then allowed to cool by disconnecting the electrically heated furnace. The properties of the resultant transparent, vitreous-crystalline material corresponded to the properties of a glass ceramic of the same chemical composition which had been converted in accordance with the heating program described in Example 2 (Table 6).

We claim:

1. Glass, having a working temperature in the range of 1,190° C. to 1,320° C. for a viscosity of $10^4$ poises convertible by heat treatment to, transparent glass ceramic, consisting essentially of in weight percent:

| | |
|---|---|
| 35–70 | $SiO_2$ |
| 17–32 | $Al_2O_3$ |
| 5–17 | $P_2O_5$ |
| 2–5 | $Li_2O$ |
| 0–4 | $MgO$ |
| 0–5 | $ZnO$ |
| 1.5–6 | $TiO_2$ |
| 0.5–3 | $ZrO_2$ |
| 0–0.6 | $Na_2O$ |
| 0.5–1 | $As_2O_3$ | and wherein the ratio of $P_2O_5$ to $TiO_2$ is up to about 4, and the sum of $TiO_2$ and $ZrO_2$ is at least about 3 weight percent, at least about 90 weight percent of the composition corresponding to β-quartz solid solution.

2. A glass composition as claimed in claim 1 having the composition in weight percent:

| | | | | |
|---|---|---|---|---|
| 57–60 | $SiO_2$ | 1.5–2.0 | $ZnO$ | |
| 21–24 | $Al_2O_3$ | 2.0–3.0 | $TiO_2$ | |
| 6–8 | $P_2O_5$ | 1.7–2.0 | $ZrO_2$ | |
| 3.3–3.6 | $Li_2O$ | 0.5–1.0 | $As_2O_3$ | |
| 0.5–0.9 | $MgO$ | 0.5–0.6 | $Na_2O$ | |

3. A glass composition as claimed in claim 1 having the composition in weight percent:

| | | | | |
|---|---|---|---|---|
| $SiO_2$ | 63.0 | | $ZnO$ | 2.4 |
| $Al_2O_3$ | 21.0 | | $TiO_2$ | 1.5 |
| $P_2O_5$ | 5.3 | | $ZrO_2$ | 2.3 |
| $Li_2O$ | 2.7 | | $Na_2O$ | trace |
| $MgO$ | 1.2 | | $As_2O_3$ | 0.6 |

4. A glass composition as claimed in claim 1 having the composition in weight percent:

| | | | | |
|---|---|---|---|---|
| $SiO_2$ | 60.7 | | $ZnO$ | 1.8 |
| $Al_2O_3$ | 19.7 | | $TiO_2$ | 4.6 |
| $P_2O_5$ | 6.3 | | $ZrO_2$ | 1.9 |
| $Li_2O$ | 3.1 | | $Na_2O$ | 0.5 |
| $MgO$ | 0.9 | | $As_2O_3$ | 0.5 |

5. A glass composition as claimed in claim 1 having the composition in weight percent:

| | | | | |
|---|---|---|---|---|
| $SiO_2$ | 57.4 | | $ZnO$ | 1.7 |
| $Al_2O_3$ | 23.3 | | $TiO_2$ | 3.2 |
| $P_2O_5$ | 6.0 | | $ZrO_2$ | 1.7 |
| $Li_2O$ | 2.9 | | $Na_2O$ | 0.5 |
| $MgO$ | 2.7 | | $As_2O_3$ | 0.6 |

6. A glass composition as claimed in claim 1 having the composition in weight percent:

| | | | | |
|---|---|---|---|---|
| $SiO_2$ | 55.3 | | $ZnO$ | 1.5 |
| $Al_2O_3$ | 25.0 | | $TiO_2$ | 2.2 |
| $P_2O_5$ | 7.9 | | $ZrO_2$ | 1.9 |
| $Li_2O$ | 4.5 | | $Na_2O$ | 0.5 |
| $MgO$ | 0.5 | | $As_2O_3$ | 0.7 |

7. A glass composition as claimed in claim 1 having the composition in weight percent:

| | | | | |
|---|---|---|---|---|
| $SiO_2$ | 53.2 | | $ZnO$ | 2.2 |
| $Al_2O_3$ | 26.3 | | $TiO_2$ | 2.6 |
| $P_2O_5$ | 7.8 | | $ZrO_2$ | 1.7 |
| $Li_2O$ | 3.9 | | $Na_2O$ | 0.6 |
| $MgO$ | 1.2 | | $As_2O_3$ | 0.5 |

8. A glass composition as claimed in claim 1 having the composition in weight percent:

| | | | | |
|---|---|---|---|---|
| $SiO_2$ | 51.3 | | $ZnO$ | 2.0 |
| $Al_2O_3$ | 24.3 | | $TiO_2$ | 4.6 |
| $P_2O_5$ | 10.5 | | $ZrO_2$ | 1.8 |
| $Li_2O$ | 3.4 | | $Na_2O$ | 0.6 |
| $MgO$ | 1.0 | | $As_2O_3$ | 0.5 |

9. A glass composition as claimed in claim 1 having the composition in weight percent:

| | | | | |
|---|---|---|---|---|
| $SiO_2$ | 46.7 | | $ZnO$ | 2.2 |
| $Al_2O_3$ | 28.8 | | $TiO_2$ | 3.0 |
| $P_2O_5$ | 11.6 | | $ZrO_2$ | 1.8 |
| $Li_2O$ | 3.8 | | $Na_2O$ | 0.5 |
| $MgO$ | 1.1 | | $As_2O_3$ | 0.5 |

10. A glass composition as claimed in claim 1 having the composition in weight percent:

| | | | | |
|---|---|---|---|---|
| $SiO_2$ | 46.0 | | $ZnO$ | 2.2 |
| $Al_2O_3$ | 28.8 | | $TiO_2$ | 3.7 |
| $P_2O_5$ | 11.6 | | $ZrO_2$ | 1.8 |
| $Li_2O$ | 3.8 | | $Na_2O$ | 0.5 |
| $MgO$ | 1.1 | | $As_2O_3$ | 0.5 |

11. A glass composition as claimed in claim 1 having the composition in weight percent:

| | | | | |
|---|---|---|---|---|
| $SiO_2$ | 44.5 | | $ZnO$ | 1.8 |
| $Al_2O_3$ | 26.5 | | $TiO_2$ | 4.6 |
| $P_2O_5$ | 15.7 | | $ZrO_2$ | 1.9 |
| $Li_2O$ | 3.1 | | $Na_2O$ | 0.5 |
| $MgO$ | 0.9 | | $As_2O_3$ | 0.5 |

12. A glass composition as claimed in claim 1 having the composition in weight percent:

| | | | | |
|---|---|---|---|---|
| $SiO_2$ | 38.9 | | $ZnO$ | 4.4 |
| $Al_2O_3$ | 29.5 | | $TiO_2$ | 4.6 |
| $P_2O_5$ | 15.3 | | $ZrO_2$ | 1.9 |
| $Li_2O$ | 2.2 | | $Na_2O$ | 0.5 |
| $MgO$ | 2.2 | | $As_2O_3$ | 0.5 |

13. A glass composition as claimed in claim 1, and consisting essentially of, in percent by weight:

| | |
|---|---|
| 52–56 | $SiO_2$ |
| 24.5–28 | $Al_2O_3$ |
| 7.5–9 | $P_2O_5$ |
| 3.7–4 | $Li_2O$ |
| 0.9–1.1 | $MgO$ |
| 2–2.5 | $ZnO$ |
| 2.6–2.9 | $TiO_2$ |
| 1.7–1.9 | $ZrO_2$ |
| 0.5–0.7 | $As_2O_3$ |
| 0.5–0.6 | $Na_2O$ |

* * * * *

UNITED STATES PATENT OFFICE
CERTIFICATE OF CORRECTION

Patent No. 3,642,504　　　　　　　　Dated February 15, 1972

Inventor(s) JURGEN PETZOLD Et. Al.

It is certified that error appears in the above-identified patent and that said Letters Patent are hereby corrected as shown below:

Col. 2, the table, MgO, No. 8, change "1.0" to --1.1--.

Col. 3, Table 2, left column, change the line reading "Properties of transparent galss" to --Properties of transparent glass ceramic--; and change the next line to read --$\alpha$ 20-300. $10^7(°C^{-1})$--

Signed and sealed this 2nd day of January 1973.

(SEAL)
Attest:

EDWARD M. FLETCHER, JR.　　　　　　ROBERT GOTTSCHALK
Attesting Officer　　　　　　　　　Commissioner of Patents